United States Patent [19]
Lane et al.

[11] Patent Number: 5,258,983
[45] Date of Patent: Nov. 2, 1993

[54] SYSTEM OF TRANSMISSION BY PACKETS WITH DATA COMPRESSION, CORRESPONDING METHOD AND APPARATUS

[75] Inventors: M. Thao Lane; M. Didler Malorey; M. Karl Miller, all of Rennes, France

[73] Assignee: Ouest Standard Telematique S.A., Ceson Sevigne, France

[21] Appl. No.: 809,167

[22] Filed: Dec. 18, 1991

[30] Foreign Application Priority Data
Dec. 19, 1990 [FR] France .................. 90 16384

[51] Int. Cl.⁵ ............................ H04J 15/00
[52] U.S. Cl. ......................... 370/118; 370/79; 370/94.1; 370/110.1; 370/17; 375/122; 455/72
[58] Field of Search ............. 370/79, 94.1, 110.1, 370/118, 17; 375/122; 455/72

[56] References Cited
U.S. PATENT DOCUMENTS

| | | | |
|---|---|---|---|
| Re. 31,182 | 3/1983 | Crager et al. | 178/3 |
| 4,058,672 | 11/1977 | Crager et al. | 178/3 |
| 4,464,650 | 8/1984 | Eastman et al. | 340/347 |
| 4,488,288 | 12/1984 | Turner | 370/60 |
| 4,890,282 | 12/1989 | Lambert et al. | 370/79 |
| 5,131,016 | 7/1992 | Broughton et al. | 375/122 |

*Primary Examiner*—Douglas W. Olms
*Assistant Examiner*—Russell W. Blum
*Attorney, Agent, or Firm*—Kinney & Lange

[57] ABSTRACT

A system of data transmission by packets in which certain data-exchange links use a transmission chain comprising two transmitter/receiver terminals and at least two intermediate units, and in which each packet is associated with the transmission of data belonging to only one link, at least some of the intermediate units including means for the compression and/or decompression, in at least one direction of transmission, of the data elements contained in the data fields of the packets transmitted, according to at least one compression algorithm. The compression and decompression units are allocated selectively to some of the links, to compress the data elements transmitted on at least a portion of the transmission chain. The compression/decompression function is selectively activated in the allocated units for at least one series of consecutive packets of the corresponding link, and is selectively deactivated for the other packets.

31 Claims, 2 Drawing Sheets

Fig. 3 ced by packets, corresponding method and apparatus -->

SYSTEM OF TRANSMISSION BY PACKETS WITH DATA COMPRESSION, CORRESPONDING METHOD AND APPARATUS

BACKGROUND OF THE INVENTION

1. Field of the Invention

The field of the invention is that of data transmission in packet mode, on any type of network and, notably, on relatively complex networks, bringing into play the notion of a virtual circuit between two transmitter/receiver terminals in a state of connection.

More precisely, the invention relates to a method of transmission by packets, implementing an adaptive data-compression algorithm.

The invention can be applied notably but not exclusively to data exchanges according to the protocol X25, standardized by the CCITT in 1984. In this case, and more generally whenever it is necessary to use a public communications network, the user has to pay a fee which depends, for example, on the type of line allocated and/or the time for which the line is used. This is notably the case with special-purpose lines allocated by the public services, the cost of which is proportional to the maximum bit rate of the line.

2. Description of the Prior Art

There already are many known systems, in the field of data transmission, implementing adaptive compression mechanisms. However, these systems relate only to point-to-point or point-multipoint links but not to complete communications networks.

Adaptive compression algorithms evolve dynamically as a function of the characteristics of the data stream, unlike static algorithms which use pre-established correspondence tables. These adaptive compression algorithms can, for example, learn the coding rules by analyzing the frequency of the characters or strings of characters, and store them in a constantly updated "dictionary". For a given direction of transmission, an adaptive compression algorithm has to be implemented both on the compressor side and on the decompressor side in a manner that is parallel and perfectly synchronized so that, at any time, the ends have strictly identical dictionaries. These algorithms, which are more complex than static algorithms, also perform better. An algorithm of this type, known as a "Ziv Lempel" algorithm, has been chosen for example in the CCITT recommendation V42a for asynchronous modems.

In the case of transmission by packets, for example according to the standard X25, many difficulties arise for the implementation of such compression systems.

First of all, the absence of a standard makes it impossible, at present, to perform the compression directly in the terminals. It is therefore necessary to transfer this compression to the network units. As a rule, a link (the word "link" is used herein to mean an exchange between two terminals) between two terminals goes through a set of intermediate nodes. The transfer of the compression to the network units, at least when the problem is initially analyzed, dictates the repetition of the decompression and compression operation in each of these intermediate nodes.

Besides, it must be noted that each of the network units most usually manage several communications simultaneously. This means that, to carry out the decompression and compression operations simultaneously, it is necessary to have substantial memorizing and processing means, dimensioned so as to cope with the maximum possible number of simultaneous links.

It is an aim of the invention, notably, to overcome the different drawbacks of the prior art in meeting the different constraints dictated by transmission in packets.

SUMMARY OF THE INVENTION

More precisely, it is an aim of the invention to provide a system of transmission in packets, implementing an adaptive data compression algorithm, in particular so as to provide a virtual increase in the bit rate of the lines used for the transmission.

It is an aim of the invention, notably, to provide a system such as this, wherein the link between two terminals is achieved on a virtual circuit, by means of a set of units or nodes connected by communications lines.

A particular aim of the invention is to provide a system such as this, carrying out a compression on virtual circuits and not on each of the internodal transmission lines (physical circuit).

Another aim of the invention is to provide a system such as this wherein the compression and decompression operations can be implemented in any one of the units constituting the transmission chain. In this way, it is possible to distribute the transmission loads while, at the same time, optimizing the distances on which the compression is done.

Yet another aim of the invention is to provide an efficient and very flexible system of data compression. In particular, the invention may take account, in an independent way, of both directions of transmission of a link, as well as many parameters such as the load of each unit, the efficiency of a compression, the benefit of a compression etc.

In a complementary way, the invention is also aimed at providing a transmission method for a system such as this.

These aims, as well as others that shall appear here below, are achieved according to the invention by means of a system of data transmission by packets, of the type comprising a plurality of transmitter/receiver terminals, that can be associated in pairs to set up links, and at least two intermediate connection units, in which certain links use a transmission chain comprising two transmitter/receiver terminals and at least two intermediate units, and in which each packet is associated with the transmission of data belonging to only one link among said set-up links, wherein at least some of said intermediate units include means for the compression and/or decompression, in at least one direction of transmission, of the data elements contained in the data fields of the packets transmitted, according to at least one compression algorithm, and wherein compression and decompression units are allocated selectively to some of said set-up links, to compress the data elements transmitted on at least a portion of the transmission chain, and wherein the compression/decompression function is selectively activated in said allocated units for at least one series of consecutive packets of the corresponding link.

The term "terminal" refers to any end system that can be connected to a network (computer, front-end processor of computers, data base service center, data acquisition terminal etc.). Thus the notion of a terminal is counterposed to that of an intermediate unit which provides for the connection of at least one terminal and/or at least one other intermediate unit, so as to set up a communications network.

According to the invention, two terminals may be associated for a particular compressed link. These two terminals may possibly manage several links between themselves and/or with other terminals simultaneously. In an optimum way, the method provides for the operations of compression between the available units. The compression is therefore managed link by link or each virtual circuit, in each direction of transmission.

Advantageously, a signalling field, present in at least certain packets of each link, includes a token indicating the activation or non-activation of the compression mode, for the link allocated to said packet and for each of said directions of transmission.

Preferably, said compression algorithm is an adaptive algorithm managing dictionaries of strings of characters at transmission and at reception, said dictionaries being updated identically at each transmission of one of said packets.

Indeed, this type of algorithm makes it possible to obtain the most efficient results of compression. By contrast, these algorithms consume much processing time and much memory: this dictates the careful distribution of the compression/decompression operations.

In an advantages embodiment of the invention, the allocating of the compression units to a set-up link is done from among the available compression units, during a step for the negotiation of the compression, a compression unit being available when it has storage resources and processing resources available in sufficient quantity for the memorizing of the dictionary and the implementation of said algorithm.

According to the invention, at least some of said units are advantageously constituted by a switch and/or an intermediate concentrator comprising compression and/or decompression means.

The invention also relates to a data transmission method for a system as described here above.

Advantageously, in this method, the setting up of a link between a calling terminal and a destination terminal includes a step of negotiation of the compression parameters including:

an initialization stage in which an activation token travels through said transmission chain between the two terminals, and is positioned in an activation position by the units available for the compression, a stage to validate the activation of the compression mode in the corresponding units of the transmission chain, said validation being done during the initialization journey of said token when, for each of said directions of transmission, the token has encountered at least one available compression unit followed by at least one available decompression unit.

The validation stage may notably consist in assigning the compression and decompression tasks to the available units that are at the greatest distance from one another in each of said directions of transmission.

Preferably, the positioning of said activation token is done in said units in taking account of at least one of the following information elements:
memory space available in said unit;
load rate of the central processing unit of said unit;
level of priority of the link in the initialization stage.

Advantageously, in addition to the activation tokens, the signalling field also includes a benefit token or token indicating the benefit of compression, for each of said directions of transmission, it being possible for said benefit token to be positioned in a position indicating benefit of compression by the units connecting each of the successive transmission lines forming said transmission chain when the characteristics of said transmission line prove such a benefit, the compression mode in one of said directions of transmission being not activated during said validation stage if said corresponding benefit token is not validated.

A transmission line may prove the existence of a benefit of compression for example when it has an available transmission capacity that is below a fixed reference and/or when it has been parametrized as a line proving the existence of a benefit during the configuration of the system.

Indeed, it is not necessary to carry out a compression if the entire set of lines used by a virtual circuit has sufficient available capacity when the link is set up. Thus, there is a saving of the resources of the units, which may then be allocated to other links.

Advantageously, said signalling field also includes an authorization token for compression and/or decompression respectively, with a fixed value for each link in each of said direction of transmission, positioned during said stage of initialization of a link between said terminals, the compression mode in said direction of transmission being not activated if said corresponding authorization token is not validated.

Said authorization token may notably be positioned:
as a function of the characteristics of the transmitted signal and/or the foreseeable efficiency of the compression of said signal, and/or as a function of an information element on the enforcing, by the user, of the compression and non-compression mode on a link.

It is clear, for example, that a terminal which transmits only characters entered by means of a keyboard does not require compression. In this case, the terminal is not systematically given permission to use the compression resources in the direction of transmission.

Advantageously, all the negotiation parameters used during said initialization stage are memorized in each of said units of said transmission chain, said parameters belonging to the group including the activation, benefit and authorization tokens and the choice of the compression algorithm and of its parameters, such as the size of the coding dictionaries.

Preferably, the first of the available compression and decompression units, respectively, encountered by the activation token during the initialization stage, reserves a memory space for the storage of the coding dictionary, the reservation of said memory space being confirmed, if necessary, during said validation stage.

In a particular embodiment of the method of the invention, said initialization stage includes the following steps:

transmission by said calling terminal of a call;
transmission, by the intermediate unit, to which said calling terminal is connected of a call packet specifying, by means of said authorization tokens, whether compression is permitted to it in each of said directions of transmission, said activation tokens being positioned in a position of non-activation and said benefit tokens being positioned in a position of non-benefit;

memorizing, in each of the units crossed, of the state of said activation, benefit and authorization tokens, positioning, in an activation position, of at least one of said activation tokens in the first of said units encountered in the outgoing direction available for the compression and/or the decompression, if the corresponding authorization token is in a position of authorization, and the reservation, in said first unit, of the memory space needed for the coding dictionaries;

positioning, in a benefit position, of at least one of said benefit tokens in the first of said units encountered upline and/or downline from a transmission line providing the existence of a benefit of compression;

reception, by said destination terminal, of said call packet;

transmission, by the intermediate unit to which said destination terminal is connected, of a confirmation packet specifying, by means of said authorization tokens, whether compression is permitted to it in each of said directions of transmission, the activation tokens being positioned in a position of non-activation and the benefit tokens being equal to the benefit tokens received in said call packet;

positioning, in an activation position, of at least one of said activation tokens in the first of said units encountered in the return direction, available for compression and/or decompression, if the corresponding activation and benefit tokens memorized are in a position of activation and benefit respectively, and if the corresponding authorization tokens received are in an authorization position, and the reservation, in said unit, of the memory space needed for the coding dictionaries;

release, in said first unit encountered in the outgoing direction in which compression is possible, of the reserved memory space for at least one of said directions of transmission, if the corresponding activation token is not positioned in a position of activation.

Advantageously, the method of the invention includes a step for the deactivation of said compression mode in at least one of said directions of transmission, capable of being activated by each of said units carrying out said compression and/or said decompression, the deactivation information element being transmitted by the positioning of said corresponding activation token in the non-activation position.

Indeed, depending on the development of a link (efficiency of compression) and/or the development of all the links (the creation of new links), it is particularly worthwhile or beneficial to be able to deactivate a compression operation.

In a preferred embodiment, said deactivation stage comprises the following steps:

transmission, by one of said units providing for the compression and/or the decompression, of a packet comprising an activation token in a position of non-activation, said token of activation being positioned in an activation position in the preceding packets;

reception, by the second unit providing for the compression and/or the decompression, of said packet comprising an activation token in non-activation position;

release, in each of said units, of the resources reserved for the compression, the release taking place firstly in the unit that carries out the compression and then, upon the reception of a packet in which the activation token is in a non-activation position, in the unit carrying out the decompression.

Advantageously, the decision to deactivate the compression mode takes account of at least one of the following information elements:

memory space available in said unit;

rate of load of the central processing unit of said unit;

level of priority of the link;

efficiency of said compression.

In a complementary way, the method may include a step for the reactivation of said compression mode. When the load of the units gets smaller, it is thus possible to restart the compression on links where it had been eliminated. The system thus dynamically optimizes the distribution of the resources of all the units.

With respect to the data exchange itself, the method may, according to a very advantageous characteristic of the invention, include a step for testing the compressibility of the data elements of the data field of each packet, following a data compression step, said data field being transmitted in compressed form if the length of the compressed information is strictly smaller than the length of the non-compressed information and in non-compressed form if this is not the case, an information element on the transmission mode, specifying whether the transmission takes place in transmission mode or in transparent mode, being transmitted in at least certain packets.

In a preferred way, said transmission information element is transmitted by one of the following means:

the positioning of an information element of said transmission mode in a field of each of the packets transmitted;

the positioning of an information element on said transmission mode in a field of each packet corresponding to a change in the transmission mode;

the transmission of a specific mode-change packet at each change in transmission mode.

The invention clearly also relates to any type of connection unit that is used in the above-described system and/or implements the method of the invention.

BRIEF DESCRIPTION OF THE DRAWINGS

Other features and advantages of the invention shall appear from the following description of a preferred embodiment of the invention, given by way of an illustrative and non-restrictive example, and from the appended drawings, of which.

DETAILED DESCRIPTION OF THE INVENTION

The embodiment described here below applies notably to communications networks using the standard X25. It is clear, however, that the invention cannot be restricted to networks of this type but may, on the contrary, find application in all cases where exchanges of data are done in packet mode, and also in frame mode.

More precisely, the present system seeks to equip connection units providing connection to communications networks, and notably switches and/or concentrators including data compression means.

Before giving a more precise description of the mechanisms for negotiating the compression according to the invention, we shall describe an example of an adaptive algorithm that can be implemented, and the general principles of the transfer of the packets.

The compression algorithm used is based on a so-called Ziv Lempel algorithm. The basic principles for the coding, decoding and updating of the dictionaries are close to those described in the recommendation V42a. By contrast, the functions of checking the compression and the negotiation are done differently, as shall be seen further below.

The states and the modes of transfer of the data relating to the compression on a virtual circuit are advantageously the following for each direction of transmission:

"Deactivated compression" state: in this state, no resource (memory for the dictionaries and processing time in the central processing unit) is allocated to the compression. This is the initial state when a link without compression is set up;

"Activated compression" state: in this state, a dictionary is allocated to the compression, in each unit carrying out the compression and/or the decompression. The data elements can then be transferred in two modes for each packet to be transmitted:

Compressed mode: the data elements are transferred in compressed form;

Transparent mode: the data elements are transferred in their initial form.

In the activated compression step, the coding/decoding algorithm is always carried out, for the updating of the dictionaries, whether the data elements are transferred in transparent mode or in compressed mode. More precisely, the unit responsible for the decompression and receiving a packet carries out either the coding algorithm, if the packet has been transferred in compressed mode, or the decoding algorithm if the packet has been transferred in transparent mode.

Packet transmission further dictates certain constraints with respect to compression. In particular, the headers should remain readable for all the units of the transmission circuit. The compression is therefore applied exclusively to the data field of the data packet.

A packet transferred in compressed mode is coded, in the embodiment described, by code words with a length that is not a multiple of 8 bits. The last byte of a packet could therefore contain padding bits that enable the byte alignment to be recovered.

For the compression to be beneficial, it is clearly preferable for each packet transferred always to have a length smaller than or equal to that of the initial packet.

It is therefore necessary to make regular checks on the efficiency of the compression. Rather than periodically carrying out only a test of compressibility of the data, giving solely an element of information on the mean efficiency of the compression, it is advantageous to carry out a compressibility test after the compression of each packet. This test decides on the mode in which the packet will be transferred:

if the length of the packet resulting from the compression is greater than or equal to the length of the non-compressed packet, the latter is transmitted with the indication "transparent mode";

in the other case, the compressed packet is transmitted with the indication "compressed mode".

This essential feature of the invention makes it possible to pass immediately from the compressed mode to the transparent mode. It is particularly efficient at the start of the link, when the dictionary has not yet been built, and for all packets that can be subjected to little compression. This is notably the case with 1 or 2 byte packets which can never be compressed.

In the embodiment described, the compression information element is transmitted in each packet, in a particular field. However, it may also be that it is transmitted not systematically but only at each changing of a mode. In this case, it may be either a data element inserted in a packet or a specific mode-change packet.

The packet-by-packet compressibility test is preferably done and is preferably coupled to a standard method of tracking the average efficiency of the compression making it possible, for a decision to be taken when it is necessary to deactivate the compression operations.

As has already been specified, the compression/decompression functions are fulfilled independently for each link and for each direction of transmission.

The compression is done as a function of line configuration parameters, and hence identically for all the virtual circuits of one and the same line.

More precisely, the stream of data conveyed on a virtual circuit may be compressed if the following parameters are combined:

the terminal lines and/or the terminals, the ends of the virtual circuit, are configured jointly so as to accept the compression for a given direction of transmission;

the virtual circuit follows at least one internodal line on which the compression is declared to be possible;

the resources needed for the compression are declared to be available.

The compression is preferably done on the longest possible part of the virtual circuit and, therefore, advantageously between the two units to which the terminals are connected. However, if at least one of these units is not available for the compression, this compression is implemented in the first available unit encountered.

Preferably, and notably to simplify the compression deactivating operations, the compression and the decompression are done, at each end, in one and the same unit.

The compression checking functions, done independently in each direction of transmission, enable:

the negotiation of the compression when the link is set up;

the checking of the data transfer;

the passage from the compressed mode to the transparent mode and vice versa;

the deactivation of the compression, enabling the releasing of the resources (memory and processor) allocated to the compression;

the re-initialization of the dictionaries in the event of error;

the reactivation of the compression.

The negotiation of the compression may notably take account of the following parameters:

the terminal line configuration parameter (authorization token "AUT") indicating whether the compression is permitted for the communications with the terminal, in transmission and/or in reception;

the internodal line configuration parameter (benefit token "IT") indicating whether the line proves the compression for the virtual circuits that take it;

the maximum processor load allocated to the compression.

This negotiation makes it possible:

to determine whether the compression has to be activated for this virtual circuit as well as for the transmission direction or directions concerned;

to determine the localization (in the network) of the compression/decompression functions;

to reserve the resources needed for the compression.

The checking information elements used for the negotiation in the call and call-confirmation packets (three information elements in each direction of transmission) are the following in the embodiment described:

Tx—AUT: indicates whether the terminal end is configured for the compression.

Tx—IT: indicates whether at least the internodal line "with compression" is crossed by the virtual circuit.

Tx—ACT: Request for/Confirmation of activation of the compression (activation token). This information makes it possible to indicate that the compression is activated on an a priori basis, the resources having been reserved.

For the other direction of transmission, these variables are called Rx—AUT, Rx—IT and Rx—ACT.

Figure 1:
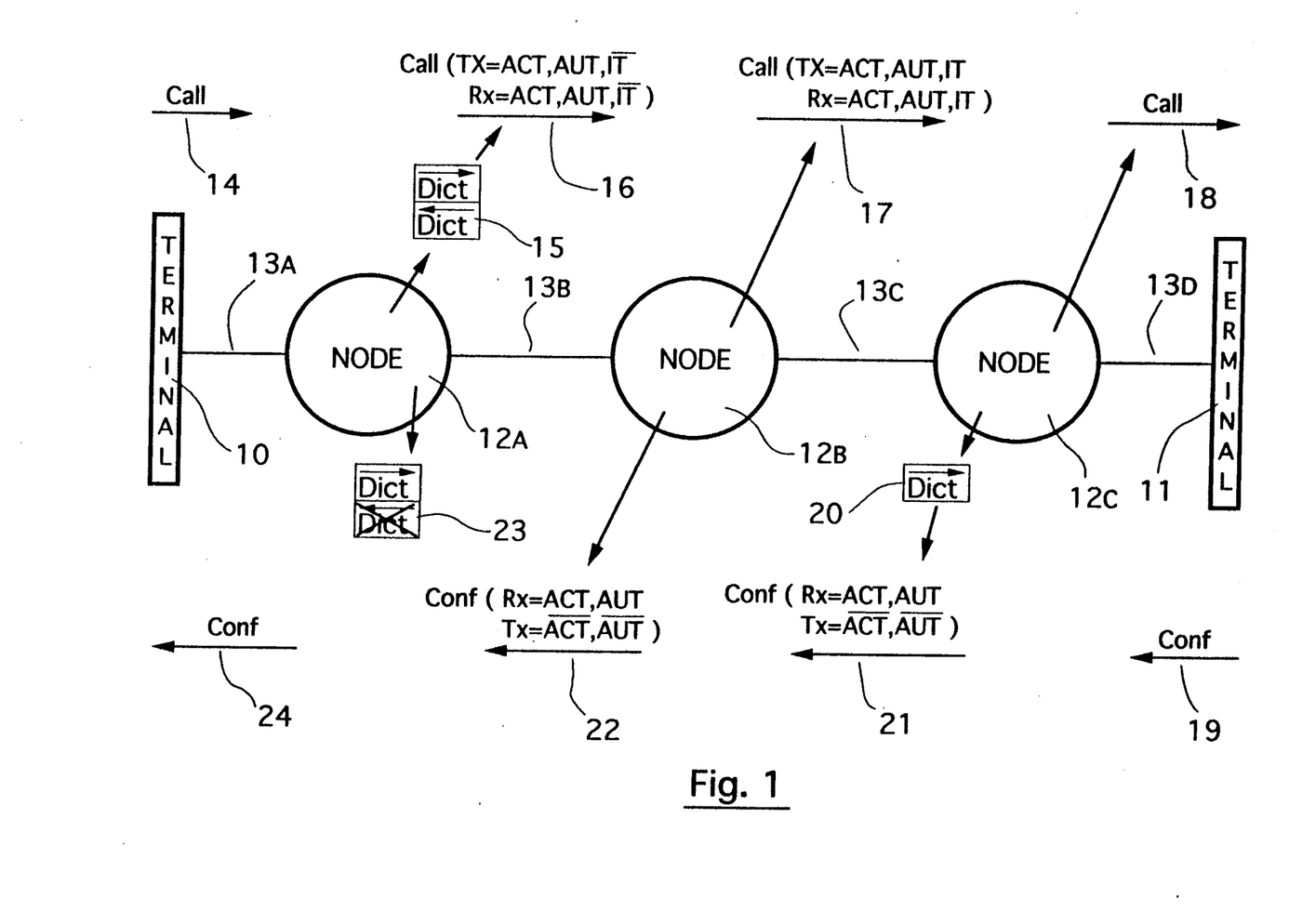
FIG. 1 is a block diagram exemplifying a negotiation of the compression of a link.

An example of a negotiation is shown in FIG. 1, wherein the terminal 10 enters into a link with the terminal 11. The link between the two terminals uses a virtual circuit crossing three intermediate nodes $12_A$, $12_B$, $12_C$ respectively connected by the transmission lines $13_A$ to $13_D$.

The negotiation is done step by step by each of the compression units (nodes) crossed by the virtual circuit.

For the embodiment described, the negotiation of the compression is done during the setting up of a virtual circuit by means of call and call-confirmation packets.

The calling terminal 10 therefore sends a call 14 on a line $13_A$, in specifying that it has been permitted compression in both directions of transmission ("AUT" tokens positioned in authorization mode). This call 14 is sent to the node $12_A$, the intermediate unit to which the terminal 10 is connected.

In this example, the node $12_A$ is considered to be available for compression in both directions of transmission, i.e. that it has the necessary resources available in terms of processing time and memory space.

This node $12_A$ therefore reserves a dictionary 15 for each direction of transmission, memorizes the parameters of the negotiation and transmits the call (16) to the internodal line 13B with an indication of compression activated in both transmission directions (activation tokens) and the indication "no IT line crossed" (no internodal line proving the compression) in the form: Call (Tx=ACT, AUT,$\overline{IT}$; Rx=ACT; AUT,$\overline{IT}$).

The node $12_B$ receives the call and memorizes the negotiation parameters. Indeed, during the call, the parameters of the negotiation are memorized by each compression function to be exploited during the call confirmation.

The node $12_B$ modifies the call (17), and more precisely the benefit token IT, to indicate that a line proving the compression, the line $13_B$ has been crossed (since the compression has been activated upline). The format of the call therefore becomes, on the line $13_C$: Call (Tx=ACT, AUT,IT; Rx=ACT,AUT,IT).

The node $12_C$ transmits the call (18) without modification at the terminal 11 after having memorized the parameters of the negotiation.

The terminal 11 returns a message confirming the call (19).

It is assumed, in this example, that the data elements coming from the terminal 11 do not have to be compressed, for example because this terminal has a very low bit rate.

The node $12_C$ to which the terminal 11 is connected therefore reserves a dictionary 20 for the terminal 10 to terminal 11 direction, since the parameters memorized indicate that the compression has been activated during the call in this direction of transmission and that at least one line proving the compression has been crossed. The compression is naturally not activated in the other direction, since it is not authorized.

The node $12_C$ therefore transmits the message Conf(Rx=ACT, AUT; Tx=$\overline{ACT}$, $\overline{AUT}$). The benefit tokens are not returned. If the compression is not "beneficial", the authorization tokens AUT are positioned in a non-authorization position.

The call confirmation is then transmitted (22) up to the node $12_A$ without modification.

The node $12_A$ releases (23) the dictionary reserved for the terminal 11 to terminal 10 direction of transmission, and transmits (24) the confirmation to the terminal 10.

After the initialization of the link, the data transfer is checked by three checking information elements transmitted, in the example described, in the data packet:

Tx—Act: Control and indication of activation of the compression in the direction of transmission from the compressor end to the decompressor end (deactivated compression/activated compression);

Tx—Comp: Indication of the transfer mode used: transparent mode (T) or compressed mode (C);

Rx—Act: Confirmation of activation of the compression for the other direction of transmission.

Figure 2:
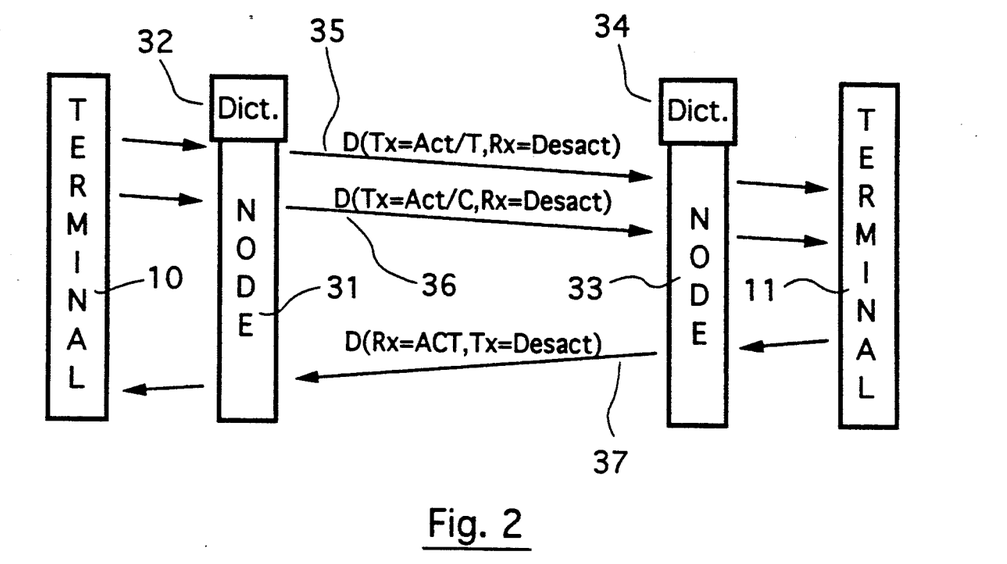
FIG. 2 illustrates a transfer of data between two terminals, the compression mode being activated in one of the directions of transmission.

FIG. 2 is an example of the transfer of data between a terminal 10 and a terminal 11, when the compression is activated in the direction 10 towards 11 but not in the direction 11 toward 10. The node 31 therefore comprises only one dictionary 32 for the compression and the node 33 comprises one dictionary 34 for the decompression.

The data exchanges may then be of three types: transmission from the terminal 10 to the terminal 11:
packet 35 transmitted in transparent mode, with header D (Tx=Act/T, Rx=Desact);
packet 36 transmitted in compressed mode, with header D (Tx=Act/C, Rx=Desact);
transmission from the terminal 11 to the terminal 10;
packet 37 transmitted systematically in transparent mode with the header D (Rx=Act, Tx=Desact).

Advantageously, the compression is deactivated on the virtual circuits for which the compression rate is smaller than a minimum.

In the same way, if the memory or processor resources become insufficient, the compression is deactivated on the virtual circuit or circuits for which the efficiency of the compression is the lowest.

Figure 3:
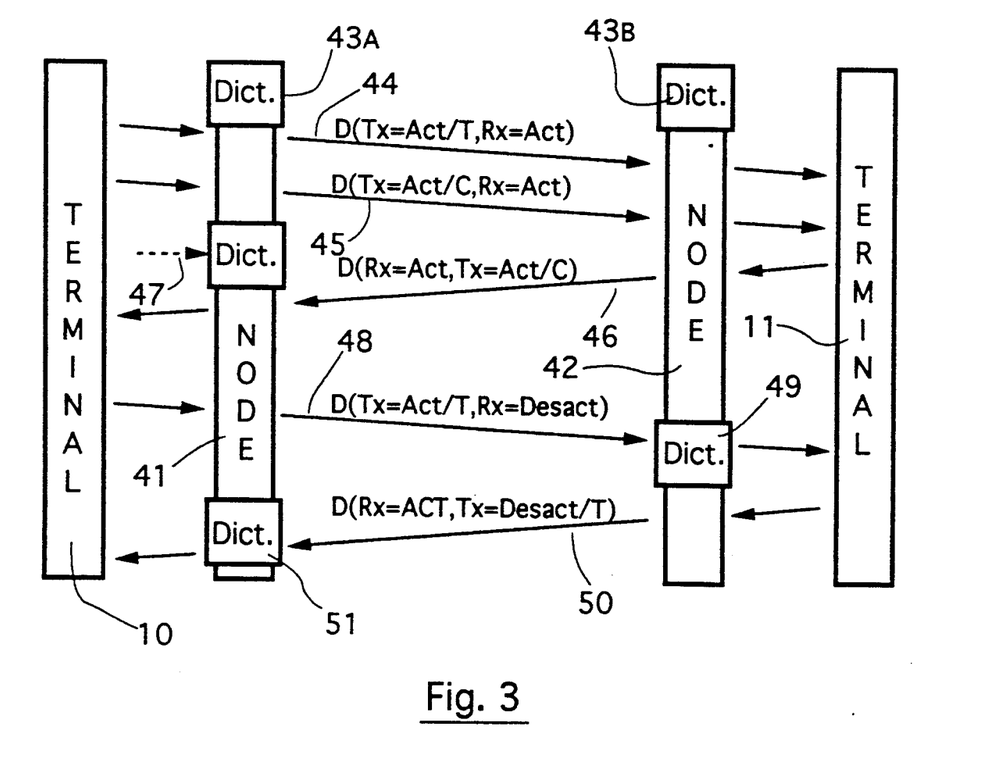
FIG. 3 illustrates the procedure of deactivation of a compression, in one of the directions of transmission.

FIG. 3 illustrates an operation of deactivation of the compression in one of the directions of transmission.

Before deactivation, the compression is activated in both directions of transmission. The units 41 and 42 therefore include each of the dictionaries $43_A$ and $43_B$ for both directions. The data exchanges are therefore done normally, in transparent form 44 or compressed form 45,46 depending on the result of the compressibility test.

At a given instant, the function of managing the resources of the unit 41 requires (47) the deactivation of the compression in the terminal 42 to terminal 41 direction. The deactivation request is transmitted at the earliest opportunity, i.e. in the first data packet 48 with the header D(Tx=Act/T (or Act/C), Rx=Desact). It must be noted that, in this way, no additional packet is added. Besides, the method of the invention can be implemented without its being necessary to add any special negotiation packet.

In another embodiment of the invention, the negotiation information elements, and notably the different tokens, may naturally be transmitted by means of specific packets. This other embodiment makes it possible to complete transparency, the headers of the packets comprising no information element specific to compression.

Upon the reception of the deactivation request 48, the unit 42 releases the dictionary for the direction 42 to 41, and transmits (50) the confirmation at the earliest opportunity, in a packet having the header D(Rx=Act, Tx=Desact/T).

At the reception of this packet 50, the unit 41 release (51) the corresponding dictionary.

Should the deactivation request relate to the direction of transmission from the deactivation requesting unit to the second unit, the procedure is slightly simpler. Indeed, the dictionary is directly deactivated, in the requesting unit, when the deactivation request packet is transmitted.

If the compression has been deactivated on a virtual circuit for lack of resources, the compression may be reactivated when the resources become sufficient again. To this end, the units have means available for the reactivation of the compression.

Advantageously, the compression may be deactivated and reactivated regularly, depending on the development of needs, and for example by the systematic elimination of the least efficient compressions if resources should be needed.

It is clear that these different examples of negotiation, header formats etc. are purely indicative. The invention can naturally be implemented in several other ways.

In particular, the nodes of such systems are not necessarily connected to a special-purpose network. They may also use a public network.

Furthermore, and although the example described has been limited, in order to simplify the description, to only one compression/decompression operation, the invention naturally applies to cases where several operations of this type are conducted successively. This case may occur, for example, during the use of a public packet transmission network and two distinct private networks at each end of this public network (in this case, the public network is considered to be a terminal).

What is claimed is:

1. In a system of data transmission by packets, of the type comprising a plurality of transmitter/receiver terminals, that can be associated in pairs to set up links, and at least two intermediate units, in which certain links use a transmission chain comprising two transmitter/receiver terminals and at least two intermediate units, and in which each packet comprises a data field and is associated with the transmission of data belonging to only one link among said set-up links, wherein at least some of said intermediate units include means for the compression and/or decompression, in at least one direction of transmission, of the data elements contained in the data fields of the packets transmitted, according to at least one compression algorithm, a method for the transmission of data between a calling terminal and a destination terminal comprising the steps of:

negotiating compression parameters including the steps of:

initializing a negotiation of the compression, in which an activation token for each of said directions of transmission travels through said transmission chain between the two terminals, said activation tokens being susceptible to take two states, a first state signifying the non-activation of the compression and a second state signifying the activation of the compression, and having its value changed to said second state signifying the activation of the compression by an intermediate unit including means available for the compression, said intermediate unit reserving the corresponding means available for the compression, validating the activation of the compression mode in the corresponding intermediate units of the transmission chain, said validation being done during the initialization journey of said activation token when, for each of said directions of transmission, the activation token has encountered at least one intermediate unit available for compression followed by at least one intermediate unit available for decompression; and transmitting data between said terminals, the compression and the decompression being carried out in the corresponding intermediate units selected during said step of negotiating, if they have been validated during the step of validating.

2. A method according to claim 1, wherein said compression algorithm is an adaptive algorithm managing dictionaries of strings of characters at transmission and at reception, said dictionaries being updated identically at each transmission of one of said packet.

3. A method according to claim 2, wherein the first of the available compression and decompression units, respectively, encountered by the activation tokens during the step of initializing, reserves a memory space for the storage of the coding dictionary, the reservation of said memory space being confirmed, if necessary, during said step of validating.

4. A method according to claim 1, wherein, in said step of initializing, the changing of the state of said activation tokens is done in said intermediate units in taking account of at least one of the following information elements:

memory space available in said intermediate unit;
   load rate of the central processing unit of said intermediate unit;
   level of priority of the link in the initialization step.

5. A method according to claim 1, wherein a signalling field, present in at least certain packets of each link, includes said activation tokens and a benefit token or token indicating the benefit of compression for each of said directions of transmission, said benefit token being susceptible to take two states, a first state signifying a non-benefit of compression and a second state signifying a benefit of compression, said benefit token having its value changed to said second state signifying a benefit of compression by the intermediate units connecting each of the successive transmission lines forming said transmission chain when the characteristics of said transmission line prove such a benefit, and wherein the compression mode in one of said directions of transmission is not activated during said step of validating if said corresponding benefit token is in said first state signifying a non-benefit of the compression.

6. A method according to claim 5, wherein a transmission line proves the existence of a benefit of compression when at least one of the following requirements is met:

the line has an available transmission capacity that is below a fixed reference;

the line has been parametrized as a line proving the existence of a benefit during the configuration of the system.

7. A method according to claim 1, wherein a signalling field includes said activation tokens and an authorization token for compression and/or decompression respectively, for each link in each of said directions of transmission, said authorization token being susceptible to take two states, a first state signifying a non-authorization of compression and a second state signifying an authorization of compression, the state of said authorization tokens being changed by said terminals, during said step of initializing, and wherein the compression mode in said direction of transmission is not activated if said corresponding authorization token is not validated.

8. A method according to claim 7, wherein said authorization token has its state modified as a function of at least one of the pieces of information belonging to the group comprising:

the characteristics of the transmitted signal;

the foreseeable efficiency of the compression of said signal;

an information element on the enforcing, by the user, of the compression and non-compression made on a link.

9. A method according to claim 7, wherein said signalling field further includes a benefit token or token indicating the benefit of compression for each of said directions of transmission, said benefit token being susceptible to take two states, a first state signifying a non-benefit of compression and a second state signifying a benefit of compression, said benefit token having its value changed to said second state signifying a benefit of compression by the intermediate units connecting each of the successive transmission lines forming said transmission chain when the characteristics of said transmission line prove such a benefit, and wherein the compression mode in one of said directions of transmission is not activated during said step of validating if said corresponding benefit token is in said first state signifying a non-benefit of the compression.

10. A method according to claim 9, wherein said step of initializing includes the following steps:

transmission by said calling terminal of a call;

transmission, by the intermediate unit to which said calling terminal is connected, of a call packet specifying, by means of said authorization tokens, whether compression is permitted to it in each of said directions of transmission, said activation tokens being in said first state signifying the non-activation and said benefit tokens being in said first state signifying the non-benefit;

memorizing, in each of the intermediate units crossed, of the state of said activation, benefit and authorization tokens, modifying the state of at least one of said activation tokens from said first state signifying the non-activation of the compression to said second state signifying the activation of the compression, in the first of said intermediate units encountered in the outgoing direction available for the compression and/or the decompression, if the corresponding authorization tokens are in the second state signifying the authorization of the compression, and reserving, in said first intermediate unit, of the memory space needed for the coding dictionaries;

modifying the state of at least one of said benefit tokens from said first state signifying the non-benefit of the compression to said second state signifying the benefit of the compression in the first of said intermediate units encountered upline and/or downline from a transmission line proving the existence of a benefit of compression;

reception, by said destination terminal, of said call packet;

transmission, by the intermediate unit to which said destination terminal is connected, of a confirmation packet specifying, by means of said authorization tokens, whether compression is permitted to it in each of said directions of compression respectively, the state of the activation tokens being equal to said first state signifying the non-activation of the compression and the state of the benefit tokens being equal to the state of the benefit tokens received in said call packet;

modifying the state of at least one of said activation tokens from said first state signifying the non-activation of the compression to said second state signifying the activation of the compression in the first of said intermediate units encountered in the return direction, available for compression and/or decompression, if the states of the corresponding activation and benefit tokens memorized are in the second state signifying the activation of the compression and in the second state signifying the benefit of the compression, respectively, and if the corresponding authorization tokens received are in the second state signifying the authorization of the compression, and the reservation, in said intermediate unit, of the memory space needed for the coding dictionaries;

release, in said first intermediate unit encountered in the outgoing direction in which compression is possible, of the reserved memory space for at least one of said directions of transmission, if the state of the corresponding activation token is equal to said first state signifying the non-activation of the compression.

11. A method according to claim 1, wherein all the negotiation parameters used during said step of initializing are memorized in each of said intermediate units of said transmission chain, said parameters belonging to the group including the activation, benefit and authorization tokens and the choice of the compression algorithm and of its parameters, such as the size of the coding dictionaries.

12. A method according to claim 1, including a step for the deactivation of said compression mode in at least one of said directions of transmission, capable of being activated by each of said intermediate units carrying out said compression and/or said decompression, and wherein a deactivation information element is transmitted by modifying the state of said corresponding activation token in from said second state signifying the activation of the compression from the first state signifying the non-activation of the compression.

13. A method according to claim 12, wherein said deactivation step comprises the following steps:

transmission by one of said intermediate units providing for the compression and/or the decompression, of a packet comprising an activation token being in said first state signifying the non-activation of the compression, said token of activation being in said second state signifying the activation of the compression in the preceding packets;

reception, by the second intermediate unit providing for the compression and/or the decompression, of said packet comprising an activation token being in said first state signifying the non-activation of the compression;

release, in each of said intermediate units, of the resources reserved for the compression, the release taking place firstly in the intermediate unit that carries out the compression and then, upon the reception of a packet in which the activation token is in said first state signifying the non-activation, in the intermediate unit carrying out the decompression.

14. A method according to claim 12, wherein a decision to deactivate the compression mode takes account of at least one of the following information elements:
memory space available in said intermediate unit;
rate of load of the central processing unit of said intermediate unit;
level of priority of the link;
efficiency of said compression.

15. A method according to claim 12, comprising a step for the reactivation of said compression mode.

16. A method according to claim 1, comprising a step for testing the compressibility of the data elements of the data field of each packet, following a data compression step, said data field being transmitted in compressed form if the length of the compressed information is strictly smaller than the length of the non-compressed information, and, it not, in non-compressed form,
and wherein an information element signifying the transmission takes place in compression mode or in transparent mode, is transmitted in at least certain packets.

17. A method according to claim 16 wherein said transmission information element is transmitted by one of the following means:
the modification of the state of an information element signifying said transmission mode in a field of each of the packets transmitted;
the modification of the state of an information element signifying said transmission mode in a field of each packet corresponding to a change in the transmission mode;
the transmission of a specific mode-change packet at each change in transmission mode.

18. In a system of data transmission by packets, of the type comprising a plurality of transmitter/receiver terminals, that can be associated in pairs to set up links, and at least two intermediate units,
in which certain links use a transmission chain comprising two transmitter/receiver terminals and at least two intermediate units,
and in which each packet is associated with the transmission of data belonging to only one link among said set-up links,
wherein at least some of said intermediate units include means for the compression and/or decompression, in at least one direction of transmission, of the data elements contained in the data fields of the packets transmitted, according to at least one compression algorithm, a method for the transmission of data between a calling terminal and a destination terminal comprising the steps of:
negotiating compression parameters including the steps of
initializing a negotiation of the compression, in which a signalling field, present in at least certain packets of each link, travels through said transmission chain between the two terminals, said signalling field comprising:
an activation token indicating the activation of the compression, for each of said directions of transmission, said activation tokens being susceptible to take two states, a first state signifying the non-activation of the compression and a second state signifying the activation of the compression, and having its value changed to said second state signifying the activation of the compression by an intermediate unit including means available for the compression, said intermediate unit reserving the corresponding means available for the compression, and
a benefit token or token indicating the benefit of compression, for each of said directions of transmission, said benefit tokens being susceptible to take two states, a first state signifying a non-benefit of compression and a second state signifying a benefit of compression, said benefit token having its value changed to said second state signifying a benefit of compression by the intermediate units connecting each of the successive transmission lines forming said transmission chain when the characteristics of said transmission line prove such a benefit,
validating the activation of the compression mode in the corresponding intermediate units of the transmission chain, said validation being done during the initialization journey of said activation token when, for each of said directions of transmission, the activation token has encountered at least one intermediate unit available for compression followed by at least one intermediate unit available for decompression and when the corresponding benefit token is in said second state signifying the benefit of a compression; and
transmitting data between said terminals, the compression and the decompression being carried out in the corresponding intermediate units selected during said step of negotiating, if they have been validated during the step of validating.

19. The method according to claim 18, wherein a transmission line proves the existence of a benefit of compression when at least one of the following requirements is met:
the line has an available transmission capacity that is below a fixed reference;
the line has been parametrized as a line proving the existence of a benefit during the configuration of the system.

20. In a system of data transmission by packets, of the type comprising a plurality of transmitter/receiver terminals, that can be associated in pairs to set up links, and at least two intermediate units,
in which certain links use a transmission chain comprising two transmitter/receiver terminals and at least two intermediate units,
and in which each packet is associated with the transmission of data belonging to only one link among said set-up links, wherein at least some of said intermediate units include means for the compression and/or decompression, in at least one direction of transmission, of the data elements contained in the data fields of the packets transmitted, according to at least one compression algorithm, a method for the transmission of data between a calling terminal and a destination terminal comprising the steps of:

negotiating compression parameters including the steps of:
- initializing a negotiation of the compression, in which a signalling field, present in at least certain packets of each link, travels through said transmission chain between the two terminals, said signalling field comprising:
  - an activation token indicating the activation of the compression, for each of said directions of transmission, said activation tokens being susceptible to take two states, a first state signifying the non-activation of the compression and a second state signifying the activation of the compression, and having its value changed to said second state signifying the activation of the compression by an intermediate unit including means available for the decompression, said intermediate unit reserving the corresponding means available for the compression, and
  - an authorization token or token indicating an authorization of compression, for each of said directions of transmission, said authorization tokens being susceptible to take two states, a first state signifying a non-authorization of compression, and a second state signifying an authorization of compression, the state of said authorization tokens being changed by said terminals,
- validating the activation of the compression mode in the corresponding intermediate units of the transmission chain, said validation being done during the initialization journey of said activation token when, for each of said directions of transmission, the activation token has encountered at least one intermediate unit available for compression followed by at least one intermediate unit available for decompression and when the corresponding authorization token is in said second state signifying the authorization of a compression; and
- transmitting data between said terminals, the compression and the decompression being carried out in the corresponding intermediate units selected during said step of negotiating, if they have been validated during the step of validating.

21. A method according to claim 20, wherein said authorization token has its state modified as a function of at least one of the pieces of information belonging to the group comprising:
the characteristics of the transmitted signal;
the foreseeable efficiency of the compression of said signal;
an information element on the enforcing, by the user, of the compression and non-compression made on a link.

22. A method according to claim 20, wherein said signalling field further includes a benefit token or token indicating the benefit of compression for each of said directions of transmission, said benefit token being susceptible to take two states, a first state signifying a non-benefit of compression and a second state signifying a benefit of compression, said benefit token having its value changed to said second state signifying a benefit of compression by the intermediate units connecting each of the successive transmission lines forming said transmission chain when the characteristics of said transmission line prove such a benefit.

and wherein the compression mode in one of said directions of transmission is not activated during said step of validating if said corresponding benefit token is in said first state signifying a non-benefit of the compression.

23. A method according to claim 22 wherein said step of initializing includes the following steps:
transmission by a calling terminal of a call;
transmission, by an intermediate unit to which said calling terminal is connected, of a call packet specifying, by means of said authorization tokens, whether compression is permitted to it in each of said directions of transmission, said activation tokens being in said first state signifying the non-activation and said benefit tokens being in said first state signifying the non-benefit;
memorizing, in each of the intermediate units crossed, of the state of said activation, benefit and authorization tokens,
modifying the state of at least one of said activation tokens from said first state signifying the non-activation of the compression to said second state signifying the activation of the compression, in the first of said intermediate units encountered in the outgoing direction available for the compression and/or the decompression, if the corresponding authorization tokens are in the second state signifying the authorization of the compression, and reserving, in said first intermediate unit, of the memory space needed for the coding dictionaries;
modifying the state of at least one of said benefit tokens from said first state signifying the non-benefit of the compression to said second state signifying the benefit of the compression in the first of said intermediate units encountered upline and/or downline from a transmission line proving the existence of a benefit of compression;
reception, by a destination terminal, of said call packet;
transmission, by the intermediate unit to which said destination terminal is connected, of a confirmation packet specifying, by means of said authorization tokens, whether compression is permitted to it in each of said directions of compression respectively, the state of the activation tokens being equal to said first state signifying the non-activation of the compression and the state of the benefit tokens being equal to the state of the benefit tokens received in said call packet;
modifying the state of at least one of said activation tokens from said first state signifying the non-activation of the compression to said second state signifying the activation of the compression in the first of said intermediate units encountered in the return direction, available for compression and/or decompression, if the states of the corresponding activation and benefit tokens memorized are in the second state signifying the activation of the compression and in the second state signifying the benefit of the compression, respectively, and if the corresponding authorization tokens received are in the second state signifying the authorization of the compression, and the reservation, in said intermediate unit, of the memory space needed for the coding dictionaries;

release, in said first intermediate unit encountered in the outgoing direction in which compression is possible, of the reserved memory space for at least one of said directions of transmission, if the state of the corresponding activation token is equal to said first state signifying the non-activation of the compression.

24. In a system of data transmission by packets, of the type comprising a plurality of transmitter/receiver terminals, that can be associated in pairs to set up links, and at least two intermediate units, in which certain links use a transmission cain comprising two transmitter/receiver terminals and at least two intermediate units, and in which each packet is associated with the transmission of data belonging to only one link among said set-up links, wherein at least some of said intermediate units include means for the compression and/or decompression, in at least one direction of transmission, of the data elements contained in the data fields of the packets transmitted, according to at least one compression algorithm, a method for the transmission of data between a calling terminal and a destination terminal comprising the steps of:

negotiating compression parameters including the steps of:

initializing a negotiation of the compression, in which an activation token for each of said directions of transmission travels through said transmission chain between the two terminals, said activation token being susceptible to take two states, a first state signifying the non-activation of the compression and a second state signifying the activation of the compression, and having its value changed to said second state signifying the activation of the compression by an intermediate unit including means available for the compression, said intermediate unit reserving the corresponding means available for the compression, memorizing in each of said intermediate units of said transmission chain all the negotiation parameters, said parameters including at least one of the parameters belonging to the group comprising:

said activation tokens;
authorization tokens;
benefit tokens;
choice of a compression algorithm;
choice of coding dictionaries;

validating the activation of the compression mode in the corresponding intermediate units of the transmission chain, said validation being done during the initialization journey of said activation token when, for each of said directions of transmission, the activation token has encountered at least one intermediate unit available for compression followed by at least one intermediate unit available for decompression; and transmitting data between said terminals, the compression and the decompression being carried out in the corresponding intermediate units selected during said step of negotiating, if they have been validated during the step of validating.

25. A method according to claim 24, wherein at least one of the negotiation parameters is a coding dictionary, and wherein the first of the available compression and decompression units, respectively, encountered by the activation tokens during the step of initializing, reserves a memory space for the storage of the coding dictionary, the reservation of said memory space being confirmed, if necessary, during said step of validating.

26. In a system of data transmission by packets, of the type comprising a of plurality of transmitter/receiver terminals, that can be associated in pairs to set up links, and at least two intermediate units, in which certain links use a transmission chain comprising two transmitter/receiver terminals and at least two intermediate units, and in which each packet comprises a data field and is associated with the transmission of data belonging to only one link among said set-up links, wherein at least some of said intermediate units include means for the compression and/or decompression, in at least one direction of transmission, of the data elements contained in the data fields of the packets transmitted, according to at least one compression algorithm, a method for the transmission of data between a calling terminal and a destination terminal comprising the steps of:

negotiating compression parameters including the steps of:

initializing a negotiation of the compression, in which an activation token for each of said directions of transmission travels through said transmission chain between the two terminals, said activation token being susceptible to take two states, a first state signifying the non-activation of the compression and a second state signifying the activation of the compression, and having its value changed to said second state signifying the activation of the compression by an intermediate unit including means available for the compression, said intermediate unit including means available for the compression, said intermediate unit reserving the corresponding means available for the activation;

validating the activation of the compression mode in the corresponding intermediate units of the transmission chain, said validation being done during the initialization journey of said activation token when, for each of said directions of transmission, the activation token has encountered at least one intermediate unit available for compression followed by at least one intermediate unit available for decompression; and transmitting data between said terminals, the compression and the decompression being carried out in the corresponding intermediate units selected during said step of negotiating, if they have been validated during the step of validating, comprising the steps of:

compressing the data elements of the data field of each packet, testing the compressibility of the data elements of the data field of each packet, said data field being transmitted in compressed form if the length of the compressed information is strictly smaller than the length of the non-compressed information, and, if not, in non-compresses form, transmitting in at least certain packets an information element signifying the transmission takes place in compression mode or in transparent mode.

27. A method according to claim 26, including a step for the deactivation of said compression mode in at least one of said directions of transmission, capable of being activated by each of said intermediate units carrying out said compression and/or said decompression, and wherein a deactivation information element is transmitted by modifying the state of said corresponding activation token in from said second state signifying the activation of the compression from the first state signifying the non-activation of the compression.

28. A method according to claim 27, wherein said deactivation step comprises the following steps:
transmission by one of said intermediate units providing for the compression and/or the decompression, of a packet comprising an activation token being in said first state signifying the non-activation of the compression, said token of activation being in said second state signifying the activation of the compression in the preceding packets;
reception, by the second intermediate unit providing for the compression and/or the decompression, of said packet comprising an activation token being in said first state signifying the non-activation of the compression;
release, in each of said intermediate units, of the resources reserved for the compression, the release taking place firstly in the intermediate unit that carries out the compression and then, upon the reception of a packet in which the activation token is in said first state signifying the non-activation, in the intermediate unit carrying out the decompression.

29. A method according to claim 27, wherein a decision to deactivate the compression mode takes account of at least one of the following information elements:
memory space available in said intermediate unit;
rate of load of the central processing unit of said intermediate unit;
level of priority of the link;
efficiency of said compression.

30. A method according to claim 27, comprising a step for the reactivation of said compression mode.

31. A method according to claim 26 wherein said transmission information element is transmitted by one of the following means:
the modification of the state of an information element signifying said transmission mode in a field of each of the packets transmitted;
the modification of the state of an information element signifying said transmission mode in a field of each packet corresponding to a change in the transmission mode;
the transmission of a specific mode-change packet at each change in transmission mode.

* * * * *

UNITED STATES PATENT AND TRADEMARK OFFICE
CERTIFICATE OF CORRECTION

PATENT NO. : 5,258,983

DATED : November 2, 1993

INVENTOR(S) : M. Thao Lane, M. Didler Malorey, M. Karl Miller

It is certified that error appears in the above-identified patent and that said Letters Patent is hereby corrected as shown below:

Col. 12, line 30, delete "packet", insert --packets--

Col. 15, line 29, delete "claim 1", insert --claim 12--

Signed and Sealed this

Twelfth Day of April, 1994

*Attest:*

BRUCE LEHMAN

*Attesting Officer*     *Commissioner of Patents and Trademarks*